United States Patent

Hsu

[11] Patent Number: 5,579,848
[45] Date of Patent: Dec. 3, 1996

[54] GARDEN TOOL

[76] Inventor: Shih-Hao Hsu, No. 426, Dou Yuen East Road, Her Fong Village, Bi Tou Hsiang, Chang Hua Hsien, Taiwan

[21] Appl. No.: 609,653

[22] Filed: Mar. 1, 1996

[51] Int. Cl.⁶ ............................................ A01B 1/22
[52] U.S. Cl. .................... 172/378; 172/371; 16/114 R; 16/110 R; 403/299; 403/301; 403/314; 403/341
[58] Field of Search .................... 172/378, 371; 16/114 R, 110 R, 113; 15/145, 143.1; 403/118, 299, 301, 300, 314, 341, 370; 7/167

[56] References Cited

U.S. PATENT DOCUMENTS

| | | | |
|---|---|---|---|
| 3,143,984 | 8/1964 | Morasch | 172/371 X |
| 3,545,551 | 12/1970 | Niemeyer | 172/371 |
| 4,371,282 | 2/1983 | Sturm | 16/114 X |
| 4,961,443 | 10/1990 | Buccicone et al. | 16/114 X |
| 5,161,278 | 11/1992 | Tomm | 16/114 X |
| 5,172,447 | 12/1992 | Tomm | 15/145 X |
| 5,226,198 | 7/1993 | Martin | 16/114 X |
| 5,350,021 | 9/1994 | Walker | 172/371 X |
| 5,477,929 | 12/1995 | Kenyon et al. | 172/371 X |
| 5,483,720 | 1/1996 | Decoopman et al. | 15/145 R X |
| 5,496,126 | 3/1996 | Lin | 403/370 |

Primary Examiner—Terry Lee Melius
Assistant Examiner—Christopher J. Novosad
Attorney, Agent, or Firm—Charles E. Baxley, Esq.

[57] ABSTRACT

A garden tool includes a beam having a tool secured to one end and having a ring and one or more fins formed in the other end. A handle has a number of blades tapered radially outward and has a number of gaps formed between the blades for engaging with the fins. A barrel has an inner thread for engaging with an outer thread of the ring and has a tapered surface formed in the inner peripheral portion for forcing the blades radially inward and for engaging the fins with the gaps such that the handle may be solidly and quickly secured to the beam.

2 Claims, 3 Drawing Sheets

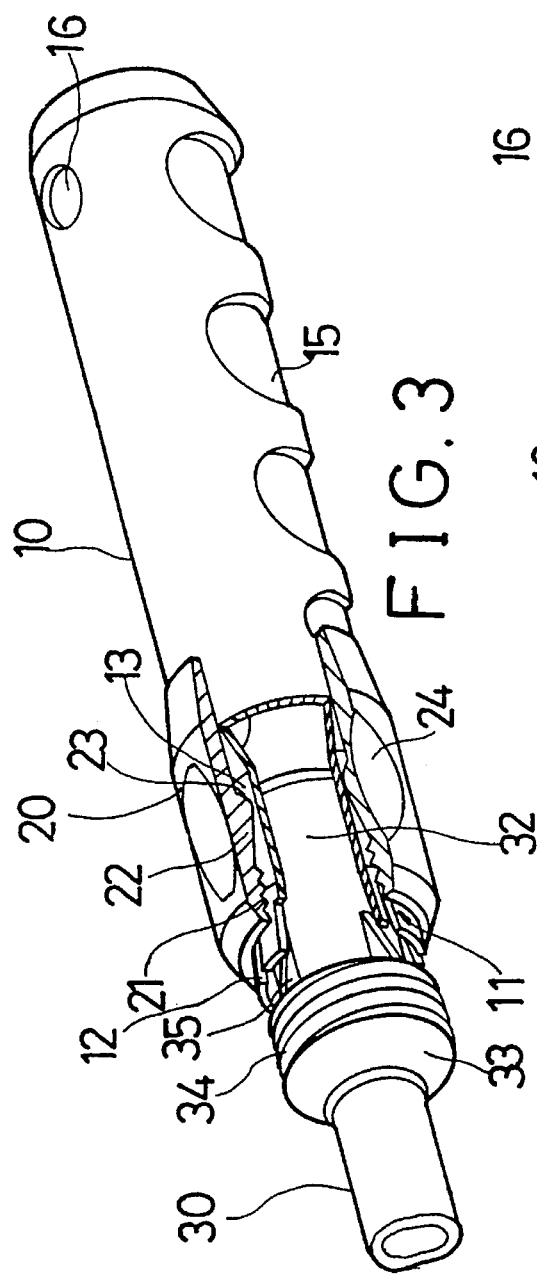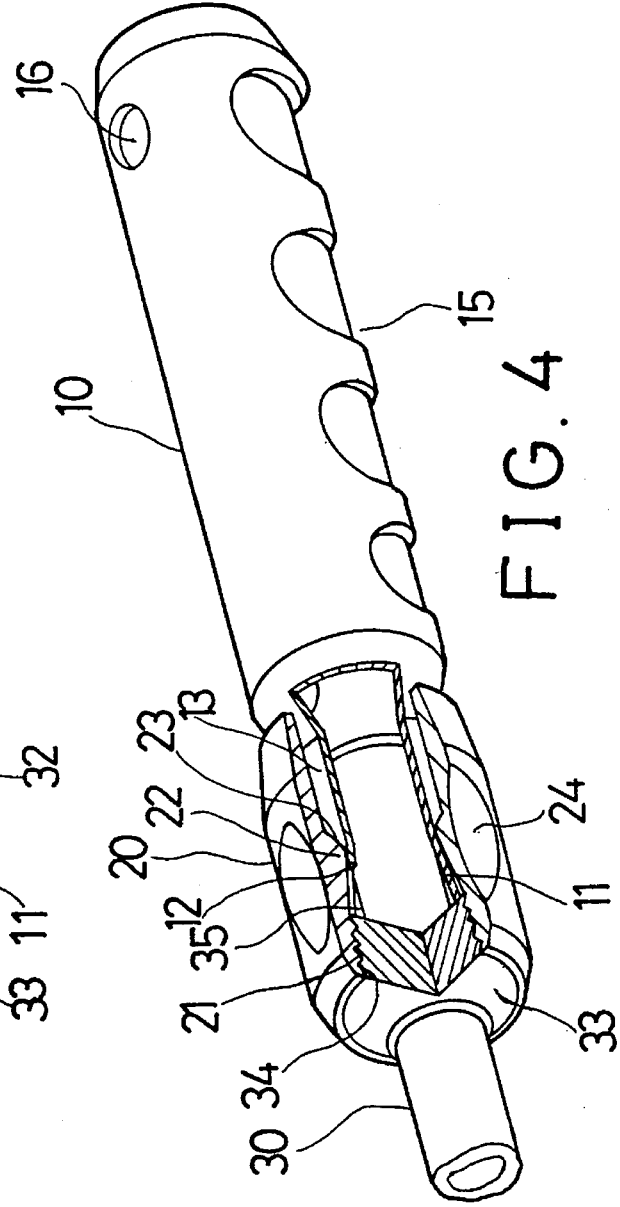

GARDEN TOOL

BACKGROUND OF THE INVENTION

1. Field of the Invention

The present invention relates to a garden tool, and more particularly to a garden tool having a handle that may be solidly secured thereto.

2. Description of the Prior Art

Typical garden tools, such as rakes, comprise a beam having a handle provided in one end thereof. The handle is normally solidly secured to the beam and may not be rotated relative to the beam. The other typical garden tools comprise a handle threadedly secured to the beam. However, the handle may be easily unthreaded relative to the beam and may be easily disengaged from the beam.

The present invention has arisen to mitigate and/or obviate the afore-described disadvantages of the conventional garden tools.

SUMMARY OF THE INVENTION

The primary objective of the present invention is to provide a garden tool which includes a handle that may be solidly secured to the beam.

In accordance with one aspect of the invention, there is provided a garden tool comprising a beam including a first end having a tool body provided thereon and including a second end having a ring provided thereon and having at least one fin means provided thereon, the ring including an outer thread formed thereon, a handle including a first end having a cylinder formed thereon, the cylinder including a plurality of blades extended therefrom and tapered radially outward, the blades defining a plurality of gaps therebetween for engaging with the fin means, and a barrel including an inner peripheral portion having an inner thread formed in one end portion for engaging with the outer thread of the ring so as to secure the handle to the beam, the inner peripheral portion including a middle portion having a tapered surface formed therein for engaging with the blades so as to force the blades radially inward and so as to engage the fin means with the gaps when the inner thread of the barrel is engaged with the outer thread of the ring.

The tapered surface includes a rear portion having a rounded bead formed therein for allowing the blades to be moved beyond the tapered surface.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 3 and 4 are partial perspective views illustrating the handle portion of the garden tool, in which a portion of the handle is cut off for showing the interior of the handle.

DETAILED DESCRIPTION OF THE PREFERRED EMBODIMENT

Figure 1:
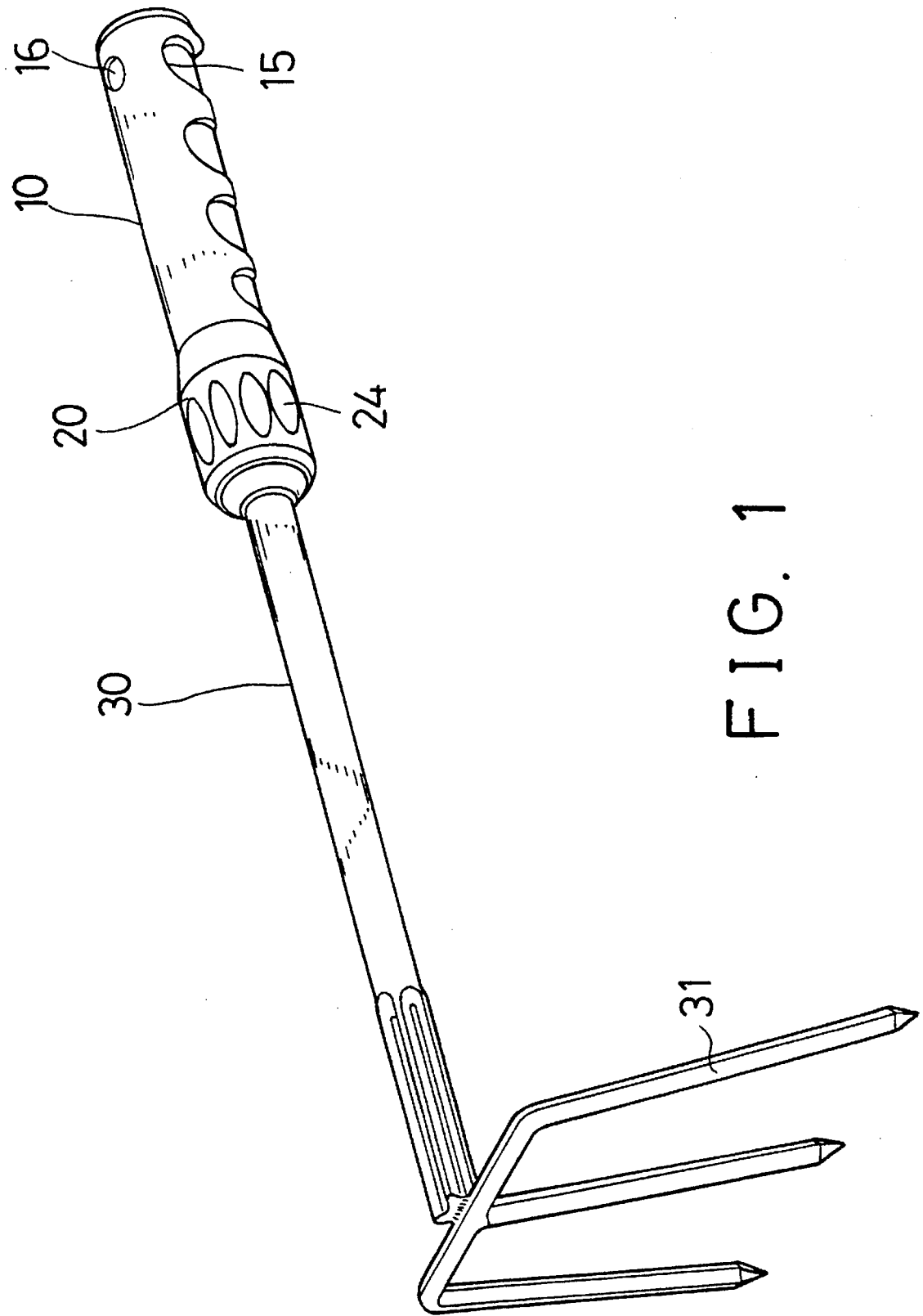
FIG. 1 is a perspective view of a garden tool in accordance with the present invention.
Figure 2:
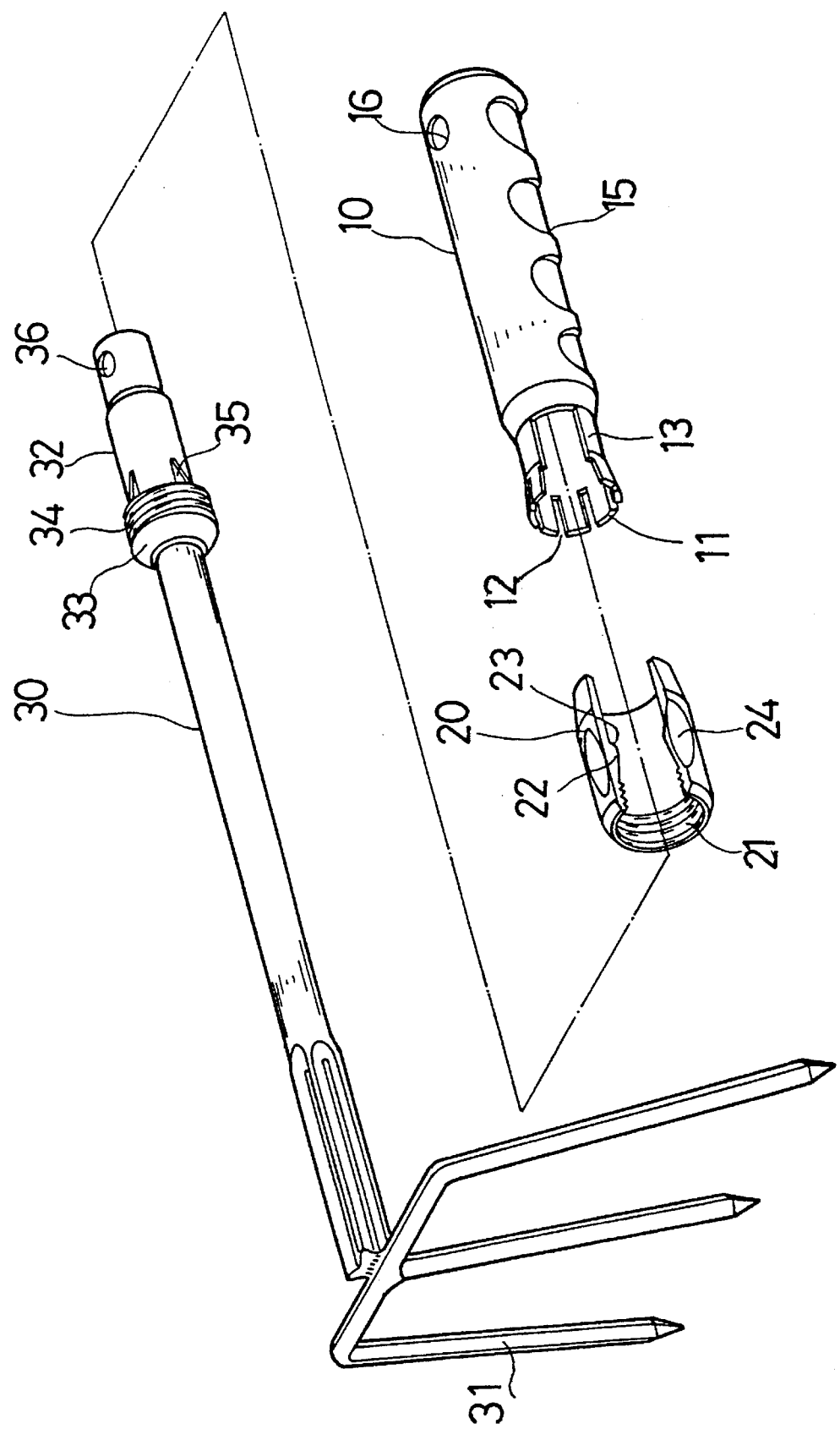
FIG. 2 is an exploded view of the garden tool.

Referring to the drawings, and initially to FIGS. 1 to 3, a garden tool in accordance with the present invention comprises a handle 10 including a cylinder 13 secured to the front end thereof and including a number of depressions 15 formed therein for engaging with the hand of the user. The handle 10 includes a hole 16 for hanging purposes. The cylinder 13 includes a number of blades 11 extended forward therefrom and slightly tapered radially outward and having a number of gaps 12 formed therebetween. A beam 30 includes a tool body 31 secured to one end thereof and includes a ring 33 provided in the other end portion 32. The ring 33 includes an outer diameter greater than that of the beam 30 and includes an outer thread 34 formed in the outer peripheral portion thereof. The end portion 32 of the beam 30 includes an orifice 36 formed therein for hanging purposes and includes a number of fins 35 provided therein for engaging with the gaps 12 of the handle 10 such that the handle 10 can be prevented from rotating relative to the beam 30. The end portion 32 of the beam 30 may be engaged in the cylinder 13 of the handle 10.

A barrel 20 is rotatably engaged on the cylinder 13 and includes an inner thread 21 formed in one end thereof for engaging with the outer thread 34 of the beam 30. The barrel 20 includes a number of recesses 24 formed in the outer peripheral portion for facilitating the gripping of the barrel 20 and for facilitating the rotation of the barrel 20. The barrel 20 includes a tapered surface formed in the inner peripheral portion thereof for engaging with the blades 11 and for forcing the blades 11 radially inward to engage with the fins 35 so as to allow the fins 35 to be solidly engaged with the gaps 12. The barrel 20 includes a rounded bead 23 formed in the rear portion of the tapered surface 22 such that the blades 11 may be easily moved through the bead 23 and such that the barrel 20 can be rotatably engaged on the cylinder 13.

Referring next to FIG. 4, in assembling, the inner thread 21 of the barrel 20 may be threadedly engaged with the outer thread 34 of the beam 30 so as to secure the handle 10 to the beam 30. When the barrel 20 is threaded relative to the ring 33 and moved toward the tool body 31, the tapered surface 22 may force the blades 11 radially inward such that the fins 35 may be solidly engaged with the gaps 12. The handle 10 may also be easily disengaged from the beam 30 when the barrel 20 is unthreaded relative to the ring 33. The handle 10 thus may be easily secured to the beam having the other tool body provided thereon.

In addition, the handle 10 may be rotated relative to the beam 30 before the fins 35 are engaged with the gaps 12 and before the barrel 20 is fully threaded relative to the ring 33.

Accordingly, the garden tool in accordance with the present invention includes a handle that may be easily and quickly and solidly secured to the beam which has a tool body secured thereto.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A garden tool comprising:

a beam including a first end having a tool body provided thereon and including a second end having a ring provided thereon and further having fin means provided thereon, said ring including an outer thread formed thereon, a handle including a first end having a cylinder formed thereon, said cylinder including a plurality of blades extended therefrom and tapered radially outward, said blades defining a plurality of gaps therebetween for engaging with said fin means, and a barrel including an inner peripheral portion having an inner thread formed in one end portion for engaging with said outer thread of said ring so as to secure said handle to said beam, said inner peripheral portion including a middle portion having a tapered surface formed therein for engaging with said blades so as to force said blades radially inward and so as to engage said fin means with said gaps when said inner thread of said barrel is engaged with said outer thread of said ring.

2. A garden tool according to claim 1, wherein said tapered surface includes a rear portion having a rounded bead formed therein for allowing said blades to be moved beyond said tapered surface.

* * * * *